Patented May 16, 1950

2,507,718

UNITED STATES PATENT OFFICE 2,507,718

INTERPOLYMERS OF ESTERS OF AZOBISFORMIC ACID

Robert M. Joyce, Jr., Wilmington, Del., assignor to E. I. du Pont de Nemours & Company, Wilmington, Del., a corporation of Delaware No Drawing. Application December 30, 1944, Serial No. 570,770

11 Claims. (Cl. 260—78.5)

This invention relates to new polymeric compositions and to methods for their preparation.

This invention has as an object the provision of new interpolymers from esters of azobisformic acid with polymerizable organic compounds containing one, and only one, ethenic double bond. A further object is to provide interpolymers of lower aliphatic alcohol esters of azobisformic acid with at least one other polymerizable organic compound containing one, and only one, ethenic double bond. Still another object is to provide interpolymers of saturated lower primary alcohol esters of azobisformic acid with another polymerizable organic compound containing one, and only one, ethenic double bond. A still further object is to provide a method for obtaining the aforementioned interpolymers. Additional objects will become apparent from an examination of the following description and claims.

These and other objects and advantages are accomplished according to the herein-described invention wherein an azobisformic acid ester, having the general formula

ROOC—N=N—COOR in which R is the non-hydroxyl portion of a saturated aliphatic monohydric alcohol, is contacted with at least one other polymerizable organic compound containing one terminal ethenic double bond as the sole non-aromatic carbon-to-carbon unsaturation, in the presence of a catalytic amount of a peroxy compound until the desired degree of polymerization has been attained, the resultant interpolymer then being recovered by conventional means.

In a more restricted embodiment of this invention an azobisformic acid ester, having the general formula ROOC—N=N—COOR, wherein R is the non-hydroxyl portion of a saturated aliphatic monohydric primary or secondary alcohol, i. e. a saturated aliphatic monohydric alcohol in which the hydroxyl group is attached to a carbon atom which is in turn attached to at least one hydrogen atom, is contacted with another polymerizable organic compound containing one terminal ethenic double bond as the sole non-aromatic carbon-to-carbon unsaturation, said contacting being effected at a temperature within the range of from 25° C. to 150° C. in the presence of from 0.001% to 2% by weight (calculated on the basis of the weight of the reactants) of a peroxy compound until the desired degree of polymerization has been attained. The resultant interpolymer is then recovered by conventional means.

A preferred embodiment of this invention comprises heating diethyl azobisformate with another polymerizable organic compound containing less than nine carbon atoms and a terminal ethenic double bond as the sole carbon-to-carbon unsaturation, said heating being effected at a temperature within the range of from 40° C. to 100° C. in the presence of from 0.1% to 0.5% benzoyl peroxide (calculated on the basis of the weight of the reactants).

The polymerizable organic compounds which are copolymerized with the azobisformic acid esters in accordance with the process of this invention are those which contain a terminal ethenic double bond as the sole non-aromatic carbon-to-carbon unsaturation, that is, a double bond between a terminal carbon atom of a carbon-to-carbon chain and the carbon atom adjacent thereto, and which have the property of polymerizing to yield macromolecular organic compounds containing a plurality of recurring units which are joined together in a chain-like manner, i. e., products having a degree of polymerization greater than a trimer.

The interpolymers of this invention are macromolecular organic compounds obtained by the conjoint polymerization of an azobisformate as hereinbefore defined with at least one polymerizable organic compound of the type referred to above.

The following examples, in which proportions are in parts by weight unless otherwise specified, are given for illustrative purposes and are not intended to place any restrictions on the herein-described invention.

Example I

A silver-lined high pressure reactor is charged with 118 parts of tert. butyl alcohol, 25 parts of diethyl azobisformate, and 0.3 part of benzoyl peroxide. The loading operation is carried out under a blanket of nitrogen. The reactor is then closed, evacuated, and 50 parts of tetrafluoroethylene is admitted under pressure. The reactor is agitated and heated at 80° C. under autogenous pressure for 4 hours. It is then cooled, the pressure released, the reactor opened, and the product, consisting of a thick yellow gum which is insoluble in tert. butyl alcohol, is removed. The alcohol is decanted from this gum, which is then washed with water and dissolved in ether. The ether extract is washed with water and then dried over anhydrous magnesium sulfate. Evaporation of the ether leaves a hard, yellow gum which quickly sets up to a brittle solid on cooling. This interpolymer contains 40.2% fluorine, which corresponds to a tetrafluoroethylene: azoester mole ratio of 1:0.51.

A sample of the polymer refluxed in an alcoholic solution of sodium hydroxide is first opaque and then becomes a flocculent precipitate. The precipitate, which is the sodium salt of the carboxylic acid obtained by saponification of the carbethoxyl groups in the interpolymer, dissolves when the reaction mixture is diluted with water. Acidification of this solution precipitates the polymeric acid, which evidently loses carbon dioxide immediately, since it does not redissolve on rendering the solution alkaline.

Example II

A silver-lined high pressure reactor is charged with 118 parts of tert. butyl alcohol, 0.3 part ammonium persulfate, 20 parts of diethyl azobisformate. The reactor is closed, evacuated, and 80 parts of tetrafluoroethylene is added under pressure. The reactor is agitated and heated at 60° C. for 4 hours under autogenous pressure. The reactor is then cooled, opened, and the product, resembling that of Example I, is removed from the reactor. It is subjected to steam distillation followed by drying at a temperature of 150° C. for 10 hours. The resulting hard, colorless, slightly brittle interpolymer contains 36.5% fluorine, corresponding to a tetrafluoroethylene:azoester mole ratio of 1:0.62. The polymer becomes rubbery at 80° C. on a melting point block. The molten polymer can readily be spun into fibers which have remarkable elasticity. These fibers can be improved in strength by stretching either at ordinary or at elevated temperatures. By suitable chemical treatment there can also be brought about improvements in the strength of the fibers and in such other properties as dye receptivity, elasticity, and solvent resistance.

Example III

A mixture of 500 parts of acrylonitrile, 450 parts of diethyl azobisformate, and 5 parts of benzoyl peroxide is heated at 60° C. for 4 days. There is obtained a quantitative yield of a clear, hard, yellow resin which is soluble in cyclohexanone and insoluble in methanol or xylene. The polymer contains 16.73% nitrogen, corresponding to an acrylonitrile:azoester mole ratio of 1:4.65.

Example IV

A mixture of 500 parts of methyl methacrylate, 435 parts of diethyl azobisformate and 5 parts of benzoyl peroxide is heated at 50° C. for 12 days. There is obtained a quantitative yield of a clear, slightly yellow, hard resin. The polymer contains 5.11% nitrogen, corresponding to a methyl methacrylate:azoester mole ratio of 1:0.268.

While this invention has been illustrated with particular reference to diethyl azobisformate, it is contemplated that all azobisformic acid esters having the general formula $$ROOC-N=N-COOR$$

in which R is the non-hydroxyl portion of a saturated aliphatic monohydric alcohol, are operative therein. However, superior products are had with azobisformic acid esters having the general formula ROOC—N=N—COOR, wherein R is the non-hydroxyl portion of a saturated aliphatic monohydric primary or secondary alcohol, i. e. a saturated aliphatic monohydric alcohol in which the hydroxyl group is attached to a carbon atom which is in turn attached to at least one hydrogen atom. Said esters can be readily obtained by reacting the chlorocarbonate obtained from the desired primary or secondary alcohol and phosgene with hydrazine and then oxidizing the resulting hydrazide. Because of their availability, ease of preparation and the superior results had therewith, azobisformic acid esters having the general formula $$ROOC-N=N-COOR$$

wherein R is the non-hydroxyl portion of a saturated aliphatic primary or secondary alcohol containing not more than six carbon atoms, are preferably employed in this invention. Included among examples of azobisformic acid esters operative in this invention are: the diethyl ester, the dimethyl ester, the dipropyl ester, the diamyl ester, the didodecyl ester, the dioctadecyl ester, as well as secondary alcohol esters of azobisformic acid.

This invention has been illustrated with particular reference to the interpolymerization of an azobisformic acid ester with tetrafluoroethylene, acrylonitrile and methyl methacrylate. It is to be understood, however, that the interpolymerization of any azobisformic acid ester, as hereinbefore defined, with any other polymerizable organic compound containing a terminal ethenic double bond as the sole carbon-to-carbon unsaturation, aside from the double bonds present in any benzene nucleus which may be contained in said other polymerizable compound, and any admixture of said polymerizable organic compounds, is within the scope of this invention. However, optimum results are had when said polymerizable organic compounds contain less than nine carbon atoms. Said polymerizable compounds containing from two to eight carbon atoms are most readily available and polymerize most readily with the hereinbefore-defined azobisformic acid esters. Included among examples of said other polymerizable compounds are: ethylene, propylene, the butylenes, styrene, vinyl acetate, vinyl fluoride, vinyl ethyl ketone, vinyl propyl ketone, vinyl methyl ketone, 1,1-dichloroethylene, 1-chloro-1-fluoroethylene, chlorotrifluoroethylene, vinyl thiolacetate, acrylic and methacrylic acids and their anhydrides, amides and nitriles and esters, vinyl ethers such as vinyl ethyl ether, vinyl propyl ether and the like.

The examples have illustrated the use of benzoyl peroxide and ammonium persulfate as catalysts. The process is operative, however, with any other peroxy compounds by which term is meant to include organic and inorganic compounds containing the bivalent group —O—O—. Suitable examples, in addition to benzoyl peroxide, are lauroyl peroxide, acetyl benzoyl peroxide, diethyl peroxide, methyl ethyl peroxide, succinyl peroxide, hydrogen peroxide, sodium and potassium persulfates and percarbonates and the like. If desired, these peroxy compounds can be used in conjunction with polymerization accelerators such as sodium sulfite, sodium hydrosulfite, ascorbic acid, and the like. The accelerators are particularly useful with inorganic peroxides.

In general the amount of catalyst may vary from 0.001% to 2% by weight of the polymerizable monomers in the reaction mixture and preferably from 0.1 to 0.5%.

The process may be operated at pressures ranging from atmospheric up to the practical limits of the equipment employed. Generally, however, it is preferred to operate at pressures such that an appreciable concentration of monomer is present in the liquid phase. Thus, with gaseous monomers the use of superatmospheric pressures is necessary in order that an appreciable concentration of the monomer be present in the liquid phase. In the polymerization of normally liquid monomers, atmospheric pressure can be employed satisfactorily.

The particular conditions of operation are determined by the nature of the organic compound containing ethenic unsaturation being polymerized with the azobisformic acid ester. As a rule, however, it is preferred to employ anhydrous conditions.

The process may be operated either as a bulk polymerization or as a solution polymerization employing substantially anhydrous solvents such as alcohols, e. g., methyl, isopropyl, t-butyl and the like; ethers, e. g., dioxane; hydrocarbons, e. g., benzene, cyclohexane, and the like.

The process may be operated as a batch, semicontinuous or continuous operation.

In general, temperatures ranging from 25° to 150° C., and preferably in the range of from 40° to 100° C., are employed.

The ratio by weight of azobisformic acid ester to other polymerizable compounds, as hereinbefore defined, in the interpolymers obtained in accordance with this invention is within the range of from 1:9 to 9:1, interpolymers in which said ratio is within the range of from 3:7 to 7:3 being preferred on account of their superior properties.

The products of this invention are useful per se and as intermediates in the synthesis of polymeric amines, ion exchange agents, improving dye susceptibility of other polymers, adhesives, elastic films and fibers, lubricant modifiers, and the like.

As many apparently widely different embodiments of this invention may be made without departing from the spirit and scope thereof, it is to be understod that I do not limit myself to the specific embodiments thereof except as defined in the appended claims.

Having described the present invention, the following is claimed as new and useful:

1. The process for obtaining an interpolymer of diethyl azobisformate with another polymerizable organic compound containing not more than eight carbon atoms and in which the sole carbon-to-carbon unsaturation is a terminal ethenic double bond, said polymerizable compound being capable of polymerizing to yield a product having a degree of polymerization greater than that of a trimer which comprises heating from 1 to 9 parts by weight of said diethyl azobisformate with from 1 to 9 parts by weight of said other polymerizable compound at a temperature within the range of from 40° C. to 100° C. in the presence of from 0.1% to 0.5% of benzoyl peroxide, calculated on the basis of the combined weight of said diethyl azobisformate and said other polymerizable compound.

2. The process for obtaining an interpolymer of diethyl azobisformate with tetrafluoroethylene which comprises heating from 1 to 9 parts by weight of diethyl azobisformate with from 1 to 9 parts by weight of tetrafluoroethylene at a temperature within the range of from 40° C. to 100° C. in the presence of from 0.1% to 0.5% of ammonium persulfate, calculated on the basis of the combined weight of said diethyl azobisformate and said tetrafluoroethylene.

3. A macromolecular interpolymer of from 1 to 9 parts by weight of an azobisformic acid ester of a saturated aliphatic monohydric alcohol with from 1 to 9 parts by weight of a polymerizable compound containing a terminal ethenic double bond as the sole non-aromatic carbon-to-carbon unsaturation, said polymerizable compound being capable of polymerizing to yield a product having a degree of polymerization greater than that of a trimer.

4. A macromolecular interpolymer of from 1 to 9 parts by weight of an azobisformic acid ester of a saturated aliphatic monohydric alcohol containing not more than 5 carbon atoms with from 1 to 9 parts by weight of a polymerizable compound containing a terminal ethenic double bond as the sole non-aromatic carbon-to-carbon unsaturation, said polymerizable compound being capable of polymerizing to yield a product having a degree of polymerization greater than that of a trimer.

5. A macromolecular interpolymer of from 1 to 9 parts by weight of diethyl azobisformate with from 1 to 9 parts by weight of a polymerizable compound containing a terminal ethenic double bond as the sole non-aromatic carbon-to-carbon unsaturation and containing not more than 8 carbon atoms, said polymerizable compound being capable of polymerizing to yield a product having a degree of polymerization greater than that of a trimer.

6. The process for obtaining an interpolymer of an azobisformic acid ester of a saturated aliphatic monohydric alcohol with a polymerizable organic compound containing a terminal ethenic double bond as the sole non-aromatic carbon-to-carbon unsaturation, said polymerizable compound being capable of polymerizing to yield a product having a degree of polymerization greater than that of a trimer, which comprises contacting from 1 to 9 parts by weight of said ester with from 1 to 9 parts by weight of said polymerizable compound in the presence of from 0.001% to 2% by weight, calculated on the basis of the weight of the reactants, of a peroxy compound.

7. The process for obtaining an interpolymer of an azobisformic acid ester of a saturated aliphatic monohydric alcohol containing not more than 5 carbon atoms with a polymerizable organic compound containing a terminal ethenic double bond as the sole non-aromatic carbon-to-carbon unsaturation, said polymerizable compound being capable of polymerizing to yield a product having a degree of polymerization greater than that of a trimer, which comprises contacting from 1 to 9 parts by weight of said ester with from 1 to 9 parts by weight of said polymerizable compound at a temperature within the range of from 25° C. to 150° C., in the presence of from 0.001% to 2% by weight, calculated on the basis of the weight of the reactants, of a peroxy compound.

8. An interpolymer of from 1 to 9 parts by weight of diethyl azobisformate with from 1 to 9 parts by weight of tetrafluoroethylene.

9. An interpolymer of from 1 to 9 parts by weight of diethyl azobisformate with from 1 to 9 parts by weight of acrylonitrile.

10. An interpolymer of from 1 to 9 parts by weight of diethyl azobisformate with from 1 to 9 parts by weight of methyl methacrylate.

11. The process for obtaining an interpolymer of diethyl azobisformate with tetrafluoroethylene which comprises heating from 1 to 9 parts by weight of diethyl azobisformate with from 1 to 9 parts by weight of tetrafluoroethylene at a temperature within the range of from 40° C. to 100° C. in the presence of from 0.1% to 0.5% of a peroxy compound, calculated on the basis of the combined weight of said diethyl azobisformate and said tetrafluoroethylene.

ROBERT M. JOYCE, Jr.

REFERENCES CITED

The following references are of record in the file of this patent:

UNITED STATES PATENTS

| Number | Name | Date |
|---|---|---|
| 2,230,654 | Plunkett | Feb. 4, 1941 |

OTHER REFERENCES

Plattner: "Helvetica Chimica Acta," vol. 27, pages 1010–1016, June 15, 1944.

Beilstein: Handbuch der Organische Chemie, 4th edition, 2nd addition to vol. 3, pp. 97–98 (original article in Annalen der Chemie, vol. 450, pp. 237–251 (1926)).

Chem. Abst., vol. 27, pp. 4700–4702 (1943).